United States Patent
Lim et al.

(10) Patent No.: US 7,512,250 B2
(45) Date of Patent: Mar. 31, 2009

(54) SYSTEM AND METHOD FOR FAST ILLUMINATION-INVARIANT BACKGROUND SUBTRACTION USING TWO VIEWS

(75) Inventors: Ser-Nam Lim, Catonsville, MD (US); Anurag Mittal, Plainsboro, NJ (US); Larry Davis, Potomac, MD (US)

(73) Assignee: Siemens Corporate Research, Inc., Princeton, NJ (US)

( * ) Notice: Subject to any disclaimer, the term of this patent is extended or adjusted under 35 U.S.C. 154(b) by 668 days.

(21) Appl. No.: 11/282,513

(22) Filed: Nov. 18, 2005

(65) Prior Publication Data
US 2006/0204077 A1 Sep. 14, 2006

Related U.S. Application Data (60) Provisional application No. 60/630,758, filed on Nov. 24, 2004.

(51) Int. Cl.
*G06K 9/00* (2006.01)
(52) U.S. Cl. .............................. 382/103; 382/154
(58) Field of Classification Search ................. 382/103, 382/154, 254, 278, 291, 294; 348/143, 153
See application file for complete search history.

(56) References Cited

U.S. PATENT DOCUMENTS 6,798,897 B1 * 9/2004 Rosenberg ................. 382/107
6,975,755 B1 * 12/2005 Baumberg .................. 382/154

OTHER PUBLICATIONS

Yuri Ivanov, et al., "Fast Lighting Independent Background substraction," ppgs. 1-14, *2000 Kluwer Academic Publishers*.
A. Criminisi, et al., "Single View Metrology," *Department of Engineering Science.*, 1999.

* cited by examiner

*Primary Examiner*—Phuoc Tran
(74) *Attorney, Agent, or Firm*—Donald B. Paschburg; F. Chau & Associates, LLC (57) ABSTRACT

A method for eliminating errors in foreground object detection in digitized images comprises providing a reference camera and a secondary camera, vertically aligning each said camera with a baseline that is approximately perpendicular to a ground plane, wherein said reference camera is placed lower than said secondary camera, selecting a foreground pixel in a reference view of a first point in a foreground object, finding a conjugate pixel of the foreground pixel in a secondary view, using the foreground and conjugate pixels to determine an image base pixel of a base point in the reference view, wherein said base point is a point on the ground plane below the first point, and using the foreground and image base pixels to find a location where the ground plane is first visible.

22 Claims, 6 Drawing Sheets

SYSTEM AND METHOD FOR FAST ILLUMINATION-INVARIANT BACKGROUND SUBTRACTION USING TWO VIEWS

CROSS REFERENCE TO RELATED UNITED STATES APPLICATIONS

This application claims priority from "Fast illumination-Invariant Background Subtraction using Two Views: Error Analysis, Sensor Placement and Applications", U.S. Provisional Application No. 60/630,758 of Mittal, et al., filed Nov. 24, 2004, the contents of which are incorporated herein by reference.

TECHNICAL FIELD

This invention is directed to foreground object detection using background subtraction in video surveillance

DISCUSSION OF THE RELATED ART

Foreground object detection using background subtraction has been used extensively in video surveillance applications due to ease of implementation and effectiveness. Previous work has focused on using a single camera for background modeling, which is effective for many common surveillance scenarios. However, it is difficult to deal with sudden illumination changes and shadows when only a single camera is used.

The use of two cameras for background modeling serves to overcome these problems. In particular, dense stereo correspondence between two views can be used to create a disparity map, which is invariant to shadows and illumination changes. Such a disparity map can be used as an input to a disparity-based background model, in principle achieving robustness against illumination changes.

Since accurate stereo correspondences should be used for the background model, stereo algorithms can be used. However, without the aid of specialized hardware, most of these algorithms perform too slowly for real time background subtraction. Consequently, in many systems, the online stereo algorithm is implemented on hardware and is based on simpler and less accurate stereo.

Figure 2:
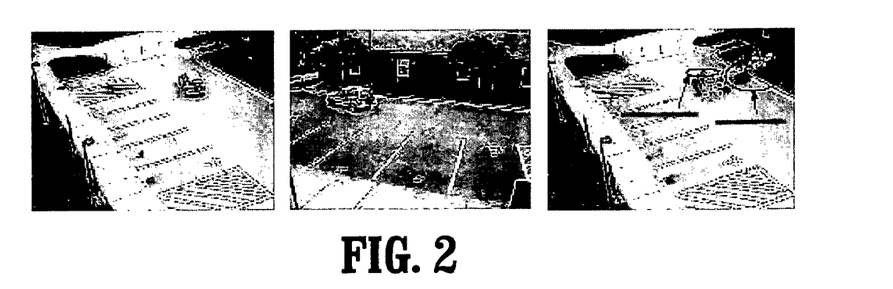
FIG. 2 illustrates detection results for a background disparity verification algorithm, according to an embodiment of the invention.

One method that does not require any specialized hardware but yet performs at videorate employs accurate stereo to construct the background model is referred to herein as a background disparity verification algorithm. Rather than performing online stereo and disparity differencing for detection, this background disparity verification algorithm uses color differences between conjugate pixels to distinguish between background and foreground. Assuming that the scene is Lambertian and that the images have been color calibrated, the intensities for both pixels of a conjugate pair will change in the same way if they both view the background (which may become shadowed or illuminated differently), but differently if only one of them is the image of a foreground object. By utilizing disparity information implicitly, this method retains the advantages of multiple-view detection, such as invariance to illumination changes and shadows, while being fast (running time λ25 fps). Since stereo is performed offline for background modeling, accurate stereo algorithms can be employed. The algorithm inherently suffers from both missed and false detections (occlusion shadows) generated by homogeneous foreground objects. FIG. 2 illustrates detection results for a background disparity verification algorithm. The left hand image is a reference view, the center image is a second view, and the right hand image illustrates foreground detection, with a missed and a false detection indicated by the circled regions in the right hand image.

SUMMARY OF THE INVENTION

Exemplary embodiments of the invention as described herein generally include methods and systems for addressing false detections from a sensor planning perspective by applying the background disparity verification algorithm using a two-camera configuration, in which the cameras are vertically aligned with respect to a dominant ground plane where the baseline is orthogonal to the plane on which foreground objects will appear. This configuration provides an initial foreground detection free of false detections. By sampling a small number of pixels from this initial foreground detection and generating stereo matches for them, missed detections can then be reduced. Since only a small number of online stereo matches is required, system performance is not compromised.

According to an aspect of the invention, there is provided a method for eliminating errors in foreground object detection in digitized images comprising the steps of providing a reference camera and a secondary camera, wherein said reference camera provides a reference view and said secondary camera provides a secondary view, vertically aligning each said camera with a baseline that is approximately perpendicular to a ground plane, wherein said reference camera is placed lower than said secondary camera, selecting a foreground pixel $I_t$ in said reference view of a first point in a foreground object, finding a conjugate pixel $I_{t'}$ of said foreground pixel in said secondary view, using said foreground pixel and said conjugate pixel to determine an image base pixel $I_b$ of a base point in said reference view, wherein said base point is a point on said ground plane below said first point, and using said foreground pixel and said image base pixel to find a location where said ground plane is first visible.

According to a further aspect of the invention, finding said conjugate pixel comprises a stereo search of pixels of said foreground object in said secondary view, wherein said pixels lie along an associated epipolar line.

According to a further aspect of the invention, finding a location where said ground plane is first visible comprises incrementing said foreground pixel $I_t$ by a small increment $\Delta I_t$ along said associated epipolar line, and using said incremented foreground pixel and said conjugate pixel to determine an incremented image base pixel $I_b$, until a difference $\|I_t - I_b\|$ is less than a predetermined magnitude.

According to a further aspect of the invention, $\Delta I_t$ is at least one pixel difference in magnitude, and is less than or equal to the difference $\|I_t - I_b\|$ pixels.

According to a further aspect of the invention, determining an image base pixel $I_b$ from said foreground pixel and said conjugate pixel comprises defining a second point m wherein the image $I_m$ of said second point in the reference view has coordinate $\Pi^1 * I_{t'}$, wherein $\Pi$ is a ground plane homography from the reference view to the second view; defining a detection ratio $\alpha$ by $$\alpha = \frac{Y_t - Y_m}{Y_t - Y_b},$$

wherein $Y_t$ is the y-coordinate of said first point t, $Y_m$ is the y-coordinate of said second point m, and $Y_b$ is the y-coordinate of said base point b; and defining said image base pixel $I_b$ by $$I_b = I_t + \frac{\|I_t - I_m\|}{\alpha}.$$

According to a further aspect of the invention, determining an image base pixel $I_b$ from said foreground pixel $I_t$ and said conjugate pixel $I_{t'}$ comprises solving $$\frac{\|I_b \times I_t\|}{\beta_{ref}(\hat{l}_{ref} \cdot I_b)\|v_{ref} \times I_t\|} = \frac{\|(\prod * I_b) \times I_{t'}\|}{\beta_{sec}(\hat{l}_{sec} \cdot (\prod * I_b)\|v_{sec} \times I_{t'}\|)},$$

wherein $\Pi$ is the ground plane homography from said reference view to said secondary view, $\beta_{ref}$ and $\beta_{sec}$ are scale factors, $1_{ref}$ and $1_{sec}$ are, respectively, normalized vanishing lines of the ground plane in the reference view and the secondary view, $v_{ref}$ and $v_{sec}$ are, respectively, vertical vanishing points of the ground plane in the reference view and the secondary view, and wherein $I_b$ is constrained to lie on the line through $I_t$ and the vertical vanishing point.

According to a further aspect of the invention, a foreground object is identified by determining a disparity map that warps said reference view into said secondary view; finding, for each primary pixel in said reference view, a corresponding pixel in said secondary view by application of said disparity map; and labeling said primary pixel as either a foreground object or an occlusion shadow of an object if said primary pixel and said corresponding secondary pixel have differing intensities.

According to a further aspect of the invention, if said primary pixel and its corresponding secondary pixel have a same intensity, labeling said primary pixel as a background pixel.

According to a further aspect of the invention, the method further comprises removing specular reflections by obtaining a set of spatially clustered foreground pixels, determining a base point for said foreground pixel cluster, constructing a base line through said base point, and filling in the foreground pixel cluster above said base line along an epipolar line through said cluster.

According to a further aspect of the invention, the method further comprises eliminating from said foreground pixel cluster any pixel detected as a foreground pixel that lies below the baseline of said object.

According to another aspect of the invention, there is provided a program storage device readable by a computer, tangibly embodying a program of instructions executable by the computer to perform the method steps for eliminating errors in foreground object detection in digitized images.

DETAILED DESCRIPTION OF THE PREFERRED EMBODIMENTS

Exemplary embodiments of the invention as described herein generally include systems and methods for background modeling and subtraction for detecting new or moving objects in a scene using a sensor configuration that eliminates false detections. An algorithm according to an embodiment of the invention can effectively eliminate most detection errors due to missed detections, specular reflections and objects being geometrically close to the background.

A background disparity verification algorithm is based on an assumption that a background is geometrically static, and that the stereo disparity between a reference camera view and a secondary camera view is also static. Thus, one can fully specify the pixel-to-pixel transformation from one image of an empty background to another prior to comparing the background disparity between any subsequent images. If one denotes a reference image by I(p), where p=(x, y) is a pixel in the reference image, a secondary image by I'(p'), where p'=(x', y') is a pixel in the secondary image, then a disparity map D(p) can be defined by p'=p−D(p), where D(p) has components $D^x(p)$ and $D^y(p)$. The function I(p) can be a scalar function whose values are gray levels, or a vector function whose values are color components. It is to be understood that although exemplary embodiments of the invention will be described herein below in terms of an I(p) whose components are color values, methods according to embodiments of the invention can be applied to scalar, gray valued images.

This algorithm also assumes that surface reflectance properties are approximately Lambertian. A Lambertian surface is is one in which light emission falls off according to the cosine of the angle between the emission direction and the surface normal.

Once a disparity map has been constructed and a reference image and a secondary image have been provided, the disparity map is applied to the reference image. The application of the disparity map to an image is referred to as warping the image. The image values of the warped reference image are then compared to the secondary image. If the two pixels have the same color and luminosity, the reference image pixel is labeled as background, otherwise if the pixels have different color or luminosity, then the pixel in the reference image either belongs to a foreground object or to an "occlusion shadow", which is a region of the reference image which is not seen in the secondary camera view due to the presence of the actual object. If multiple cameras are available, the potential object pixels can be verified by warping to each of the other auxiliary images and looking for background matches. Because the basis of comparison is the background disparity warp between two images taken at the same time, illumination or, to a certain degree, reflectance can vary without significantly affecting the performance.

A Boolean mask function f(p) that has a value of 1 for all reference pixels that belong to a foreground object can be defined by $$f(p) = \begin{cases} 0 & \text{if } |I(p) - I'(p')| < \varepsilon, \\ 1 & \text{otherwise.} \end{cases}$$

Since real measurements are rarely precise enough to satisfy this criteria, a relaxed criteria to compensate for possible errors and can be formulated to accept a value within a tolerance range:

$$f(p) = \begin{cases} 0 & \text{if } |I(p) - I'(p')| < \varepsilon, \\ 1 & \text{otherwise.} \end{cases}$$

Then, the subtracted image is formed by applying the mask function to the reference image view:

$$S(p)=f(p)I(p),$$

where S(p) is the resulting image with the background pixels removed.

Given a conjugate pair of pixels (p, p'), false detection of p occurs when p' is occluded by a foreground object but p is not. Multiple cameras can be used to avoid false detections by combining the detection of a change only when the difference from all of the other cameras is above a threshold with proper sensor planning so that neighboring occlusion shadows as well as neighboring correct and missed regions do not overlap.

Figure 1A:
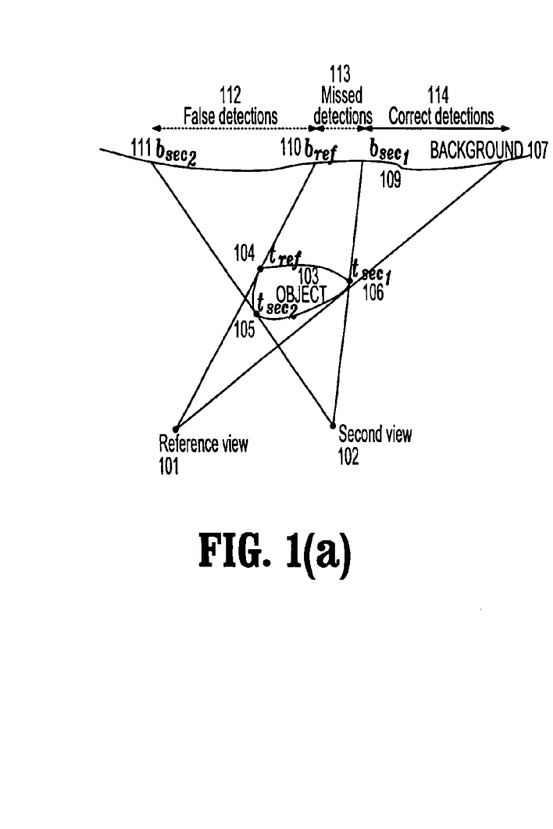
FIGS. 1(a)-(c) illustrate how false and missed detections can occur, according to an embodiment of the invention.

FIGS. 1(a)-(c) illustrate how false and missed detections can occur. FIG. 1(a) illustrates missed and false detections shown from a top view. In one exemplary embodiment of the invention, a foreground object 103 and a background 107 are provided, along with a reference view point 101 and a secondary view point 103. Three tangent points are defined on the object as shown in FIG. 1(a): $t_{ref}$ 104 corresponds to the leftmost tangent line from reference view 101, $t_{sec1}$ 106 and $t_{sec2}$ 105 correspond to both tangent lines from the second view 102, respectively. As used herein, the reference view is the image in which are identified the foreground pixels, and either of the two images can serve as the reference. The background pixels corresponding to tangent lines are $b_{ref}$ 110, $b_{sec1}$ 109 and $b_{sec2}$ 111, respectively. These points depend on the baseline, object size and object position. Regions of false detections 112, missed detections 113, and correct detections 114 are indicated in the diagram. The extent $E_p$ of the region of false detection is:

$$E_p=\min(\|Pb_{sec1}-Pb_{sec2}\|,\|Pb_{ref}-Pb_{sec2}\|) \quad (1)$$

where P is the projection matrix of the reference camera.

Figure 1B:
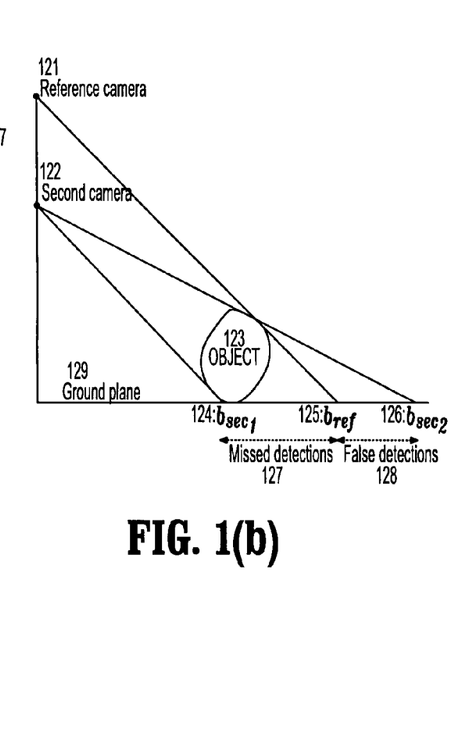

FIG. 1(b) illustrates a side view of the special case of reference camera 121 and second camera 122 vertically aligned with respect to the ground plane 129. Here the top camera 121 is taken as reference, which causes missed detection 127 of the whole object 123 in the region from $b_{sec1}$ 124 to $b_{ref}$ 125, and false detections 128 in the region from bref 125 to $b_{sec2}$ 126, as shown.

Missed detections occur when a homogenous foreground object occludes both pixels of a conjugate pair, since the two pixels will then be very similar in intensity. A simple geometrical analysis reveals that the extent $E_n$ of a region of missed detection is dependent on the baseline, object size and object position. Referring again to FIG. 1(a), $E_n$ can be expressed as:

$$E_n=\max(\|Pb_{sec}-Pb_{sec2}\|-\|Pb_{ref}-Pb_{sec2}\|,0) \quad (2)$$

As the distance between a foreground object and the background decreases, $E_n$ approaches the extent of the image of the object. Thus, when the foreground object is sufficiently close to the background, it is entirely missed. This is a common problem associated with disparity-based methods, as mentioned earlier.

Eqs. (1) and (2) suggest that there is a tradeoff between the extent of false and missed detections that depends on the placement of the sensors. Thus, one can select the sensor placement that yields the desired trade-off.

In most surveillance applications, the objects, such as people and cars, to be detected are standing and moving on a dominant principle plane, which is referred to as the ground plane. For such applications, a two-camera configuration is well suited for dealing with false detections. The two cameras are placed such that their baseline is orthogonal to the ground plane and the lower camera is used as the reference for detection. In this camera configuration, the epipolar planes are orthogonal to the ground plane.

Figure 1C:
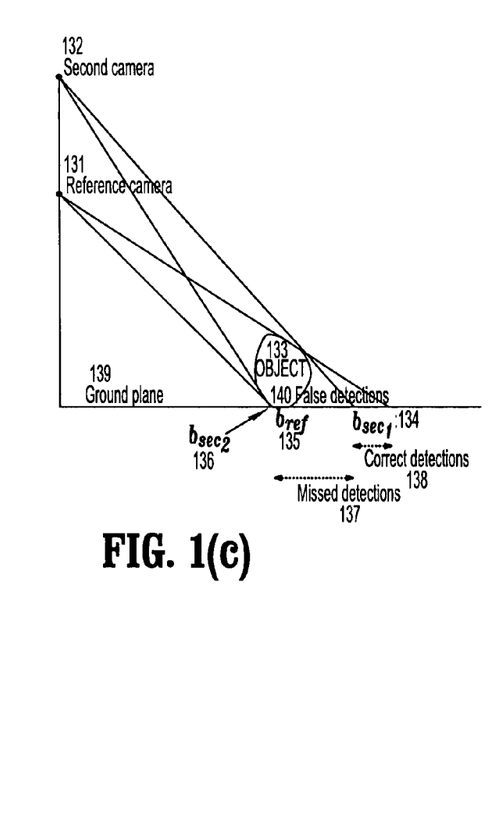

According to an embodiment of the invention, FIG. 1(c) illustrates how switching the reference camera to the lower camera eliminates most of the false detections, although a missed detection between $b_{sec2}$ and $b_{sec1}$ remains, according to Eq. (2). As shown in the figure, reference camera 131 is positioned below second camera 132. From FIG. 1(c), one can observe that if the lower camera 131 is used as the reference, false detections 140 can only be generated at the lower edge (edge closest to the ground plane) of the object 133, as opposed to using the higher camera 132 as reference, shown in FIG. 1(b). Since objects are on the ground plane, $E_p$ in Eq. (1) is close to zero, in effect eliminating any false detection. Additionally, false detection does not occur at the left or right edge since the epipolar planes are orthogonal to the ground plane. The region 138 beyond $b_{sec1}$ 134 is correctly detected. Note, however, the missed detection region 137 between $b_{sec2}$ 136 and $b_{sec1}$ 134

As previously notes, missed detections remain at the lower portion of the object. However, for an upright object that has negligible front-to-back depth, it can be shown that the proportion of an object that is missed is invariant to its position. This result plays a role in eliminating missed detections.

First, assume that foreground objects are homogeneous, that the background pixels arise from the ground plane, and that objects are upright with respect to the ground plane. Then, in a 3D space, the missed proportion of a homogeneous object with negligible front-to-back depth is independent of object position. Equivalently, the proportion that is correctly detected remains constant.

Figures 3A, 3B:
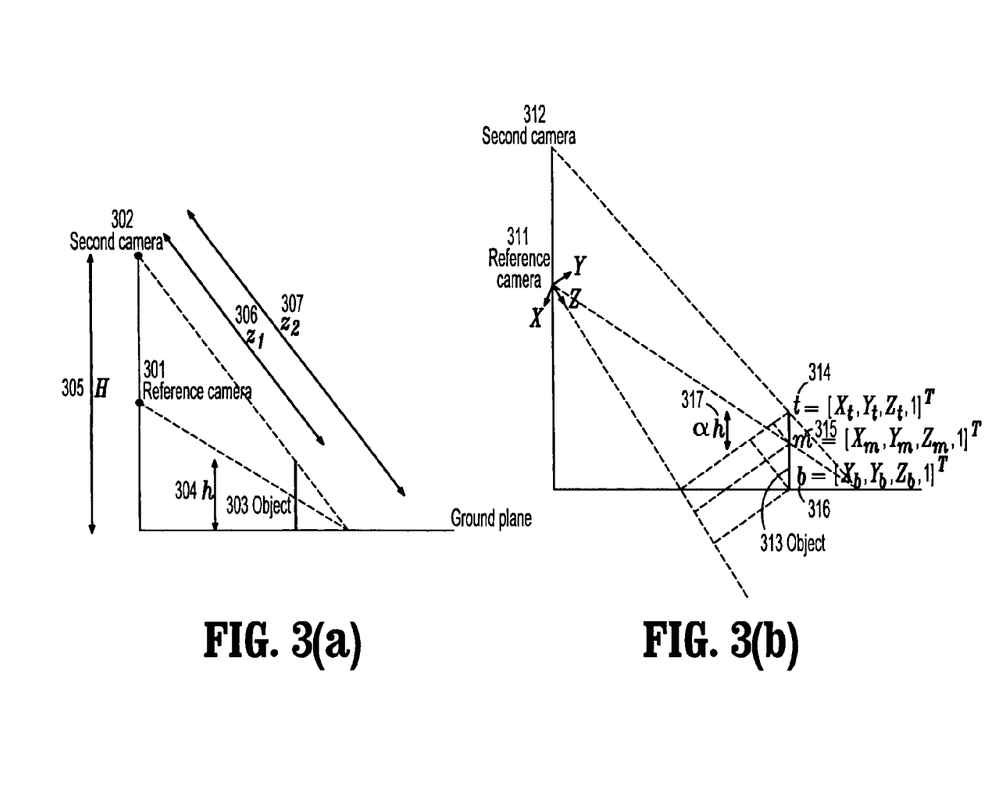
FIGS. 3(a)-(c) illustrate missed detections for a homogeneous object with negligible front-to-back depth, according to an embodiment of the invention.

FIGS. 3(a)-(c) illustrate missed detections for a homogeneous object with negligible front-to-back depth, according to an embodiment of the invention. Referring to FIG. 3(a), reference camera 301 os positioned below second camera 302. The height of the object 303 is h 304 and that of the second camera is H 305. Let the length of the baseline be $l_b$, the distance from the second camera to the top of the object be $z_1$ 306, and the distance from the second camera to the ground place be $z_2$ 307. Then, the extent of the region of missed detection is $$h - \frac{z_2 - z_1}{z_2} l_b,$$

thus giving the proportion ρ of the object that is missed as:

$$\rho = \frac{h - \frac{h}{H} l_b}{h} = 1 - \frac{l_b}{H}. \quad (3)$$

Consequently, ρ is a constant, independent of the location of the object on the ground plane.

Ideally, one would like to place the reference camera as close to the ground plane as possible so that ρ becomes zero. This is clear from Eq. (3), where a baseline of length H eliminates any missed detection. However, mounting limitations, occlusion considerations and the imaging resolution of the ground plane typically limit the maximum possible length of the baseline, leaving some missed detections at the bottom of the object. Moreover, for outdoor scenes, the reference camera should be above the object so that the corresponding background is well-defined.

Figure 4:
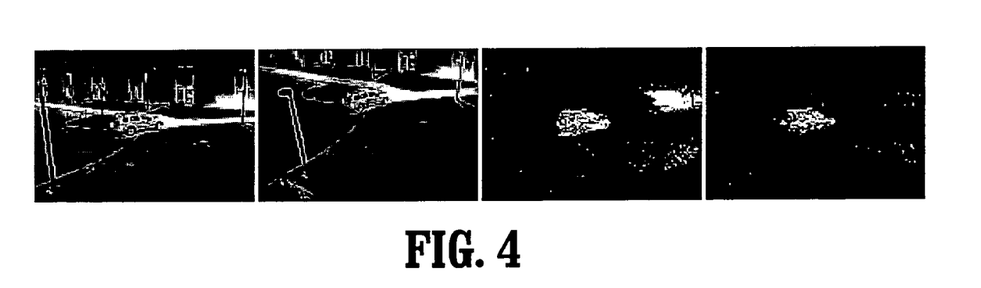
FIG. 4 illustrates the results of a sensor configuration according to an embodiment of the invention.

FIG. 4 illustrates the results of a sensor configuration according to an embodiment of the invention, where the lower of two cameras is used as the reference camera. Referring to the figure, from left to right are, respectively, the reference view of a vehicle at night, the second view of the vehicle, a single camera detection, and a two-camera detection. The vehicle's headlight is cast on the wall of a building. A sudden illumination change caused by the vehicle's headlight is detected when the single camera background subtraction is used. On the other hand, by simply using the background disparity verification algorithm with a sensor configuration according to an embodiment of the invention, the detection results are invariant to the illumination changes while false detections are effectively prevented.

Using a sensor configuration according to an embodiment of the invention, an initial detection generally free of false detections can be obtained; missed detections, however, remain at the lower portion of each object.

According to an embodiment of the invention, a method for reducing missed detections starts by considering a foreground blob ω from the initial detection. Let $I_t$ be a foreground pixel in foreground blob ω with its corresponding 3D point being t. Define the base point, b, of t as the point on the ground plane below t. The image of b is denoted as $I_b$.

A stereo search, constrained to the foreground pixels in a second view lying along the associated epipolar line, is first used to find the conjugate pixel $I_{t'}$ of $I_t$. The location of $I_t$ and $I_{t'}$, together with calibration information allows one to determine $I_b$, as further described below.

Figure 5:
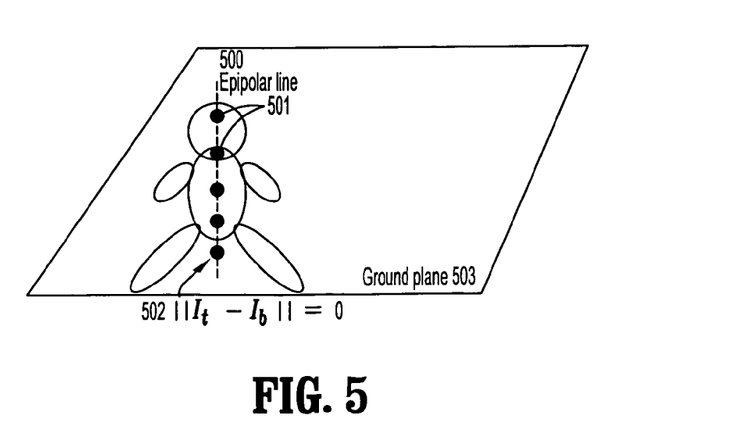
FIG. 5 illustrates an iterative approach for finding the ground plane, according to an embodiment of the invention.

If $\|I_t - I_b\|$ is sufficiently large, then $I_t$ is an off-ground-plane pixel and one begins a search along the epipolar line through $I_t$ to find the location where the ground plane is first visible. An iterative approach according to an embodiment of the invention is employed as follows: first increment $I_t$ by $\Delta I_t$ along the associated epipolar line. The base point, $I_b$, for the new $I_t$ is determined in the same fashion. The lower boundary of the foreground blob along the associated epipolar line is found when $\|I_t - I_b\|$ is less than some critical value. This iterative approach is illustrated in FIG. 5. The dots 501 along the epipolar line 500 represent the sampled pixels. The lowermost sampled pixel 502 has $\|I_t - I_b\| = 0$ since it lies on the ground plane 503 and consequently can be used as the lower boundary of the foreground blob along the epipolar line 500.

The value of $\Delta I_t$ is between 1 and $\|I_t - I_b\|$ pixels. Using the lower bound for $\Delta I_t$ generally gives a well-defined foreground blob, while using the upper bound generates a foreground bounding box. The trade-off is the number of stereo searches, decreasing as $\Delta I_t$ increases. This technique can also be extended to handle objects not moving on the ground plane surface. In this case, the iteration is terminated when the base points of the sampled pixel and the corresponding background are sufficiently close.

An iterative procedure according to an embodiment of the invention requires that the base point of a pixel be determined. This can be achieved with at least two different approaches. A first approach assumes a weak perspective projection: all points on an object have the same depth. This is often a good approximation for outdoor scenes where objects are relatively far from the cameras. When this assumption is not valid, a second approach utilizes the vertical vanishing point and the vanishing line of the ground plane.

In a weak perspective projection according to an embodiment of the invention, a camera-centered 3D coordinate system is used. FIG. 3(*b*) illustrates image projection in an exemplary, non-limiting camera-centered 3D coordinate system. Referring to the figure, reference camera 311 is positioned below second camera 312, the foreground blob $I_t$ is represented by the object 313, and t 314 is the corresponding 3D point of $I_t$. Let its 3D coordinate be $[X_t, Y_t, Z_t, 1]$. The point m 315 with 3D coordinate $[X_m, Y_m, Z_m, 1]$ is defined as the point such that image point $I_m$ has coordinate $\Pi^{-1} * I_{t'}$, where $\Pi$ is the ground plane homography from the reference to second view and $I_{t'}$ is the conjugate pixel of $I_t$ in the second view. The point b 316 is the base point of t 314 with 3D coordinate $[X_b, Y_b, Z_b, 1]$. Let the image of the base point be $I_b$. First, consider image projection in the y-direction. By consideration of similar triangles, it can be verified from FIG. 3(*b*) that:

$$\frac{Y_t - Y_m}{Y_t - Y_b} = \alpha,$$

where $\alpha = 1 - \rho$. Consequently, $Y_m$ and $Y_b$ can be expressed as:

$$Y_m = Y_t - \alpha(Y_t - Y_b),$$

$$Y_b = Y_t - \frac{1}{\alpha}(Y_t - Y_m).$$

The image positions $y_t$, $y_m$ and $y_b$ of $Y_t$, $Y_m$ and $Y_b$, respectively, can be expressed as:

$$y_t = f \frac{Y_t}{Z_t},$$

$$y_m = f\left(\frac{Y_t}{Z_m} - \alpha\left(\frac{Y_t}{Z_m} - \frac{Y_b}{Z_m}\right)\right),$$

$$y_b = f\left(\frac{Y_t}{Z_b} - \frac{1}{\alpha}\left(\frac{Y_t}{Z_b} - \frac{Y_m}{Z_b}\right)\right),$$

where $f$ is a focal length. The image ratio $$\frac{\|y_t - y_m\|}{\|y_t - y_b\|}$$

is a quantity of interest here. In the weak perspective case, the depths of points on the object are assumed to be a constant $Z_{ave}$. This gives a detection ratio:

$$\frac{\|y_t - y_m\|}{\|y_t - y_b\|} = \frac{\alpha \frac{f}{Z_{ave}} (Y_t - Y_b)}{\frac{f}{\alpha Z_{ave}} (Y_t - Y_m)} = \alpha.$$

This shows that the detection ratio is an invariant under the weak perspective assumption. The same principle applies to the image projection in the x-direction. Thus, using an $L_2$ norm, $$\|I_t - I_m\| = \sqrt{\alpha^2 (\|y_t - y_b\|^2 + \|x_t - x_b\|^2)}$$

and $$\|I_t - I_b\| = \sqrt{(\|y_t - y_b\|^2 + \|x_t - x_b\|^2)}, \text{ giving a detection ratio of}$$

$$\alpha = \frac{\|I_t - I_m\|}{\|I_t - I_b\|}.$$

Consequently, $I_b$ is given as $$I_b = I_t + \frac{\|I_t - I_m\|}{\alpha}.$$

The figure shows the object height scaled by the detection ratio $\alpha h$ 317.

Notice that $I_m$ can be determined independently using $\Pi$ and $I_{t'}$. As a result, previous assumptions made for Eq. (3) that the object is homogeneous and the background pixels are lying on the ground plane are unnecessary.

When the weak perspective assumption is not satisfied, the base point can be estimated by using additional image based calibration information in the form of the vertical vanishing point and the vanishing line of the ground plane.

Figure 3C:
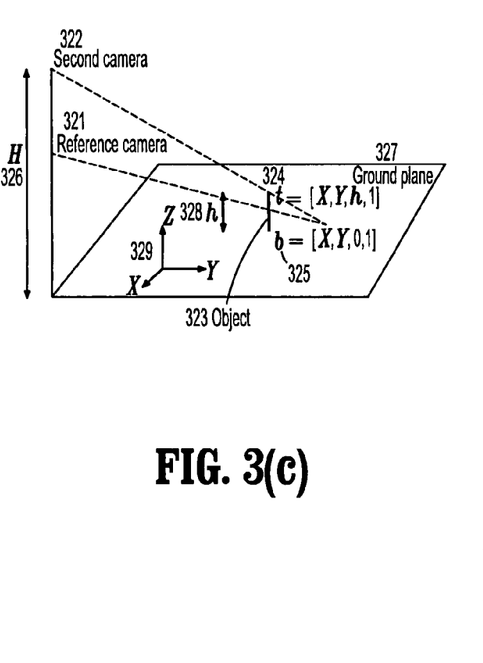

FIG. 3(c) illustrates an image projection with a 3D coordinate system on the ground plane, according to an embodiment of the invention. Once again, the reference camera 321 is positioned below the second camera 322, and the height of the second camera is H 326, and the foreground blob is represented by object 323. Consider the projection matrix P of the reference camera. Let $[P_1 \, P_2 \, P_3 \, P_4]$ represents its matrix columns. The 3D coordinate system 329 is as shown in FIG. 3(c). Let t 324 be the 3D point of $I_t$ and b 325 be the base point of t. Consequently, let the 3D coordinates of t and b be $[X, Y, h, 1]^T$ and $[X, Y, 0, 1]^T$, respectively, where h 328 is the height of the object 323 above the ground plane 327. The images of t 324 and b 325 can thus be expressed as:

$$I_b = \beta_b (XP_1 + YP_2 + P_4),$$

$$I_t = \beta_t (XP_1 + YP_2 + hP_3 + P_4),$$

where $\beta_b$ and $\beta_t$ are unknown scale factors. Let the normalized vanishing line and vertical vanishing point of the ground plane be $1_{ref}$ and $v_{ref}$ respectively. Since $P_3$ is actually the vertical vanishing point scaled by an unknown factor $\beta_{ref}$, the following is true:

$$I_t = \beta_t \left( \frac{I_b}{\beta_b} + h \beta_{ref} v_{ref} \right).$$

Taking the vector product of both terms with $I_b$, followed by taking the norm on both sides, the following expression results:

$$h \beta_{ref} = \frac{\|I_b \times I_t\|}{(\hat{1}_{ref} \cdot I_b) \|v_{ref} \times I_t\|}.$$

Thus, $\beta_{ref}$ can be computed if the height of a reference object in the scene is known. Due to errors present in the computation of $1_{ref}$ and $v_{ref}$, however, it is often required that more robust methods, such as Monte Carlo, be used for computing them.

Similarly, for the second camera, let the parameters be $\beta_{sec}$, $1_{sec}$ and $v_{sec}$. Consequently, the height in the above equation can be equated for both cameras to obtain the following equation:

$$\frac{\|I_b \times I_t\|}{\beta_{ref} (\hat{1}_{ref} \cdot I_b) \|v_{ref} \times I_t\|} = \frac{\|(\Pi * I_b) \times I_{t'}\|}{\beta_{sec} (\hat{1}_{sec} \cdot (\Pi * I_b)) \|v_{sec} \times I_{t'}\|}.$$

The image of the base point in the second view is clearly $\Pi * I_b$, where $\Pi$ is the ground plane homography. $I_{t'}$ is again the conjugate pixel of $I_t$. In addition, $I_b$ is constrained to lie on the line through $I_t$ and the vertical vanishing point. $I_b$ can thus be computed using these two constraints.

Figure 11:
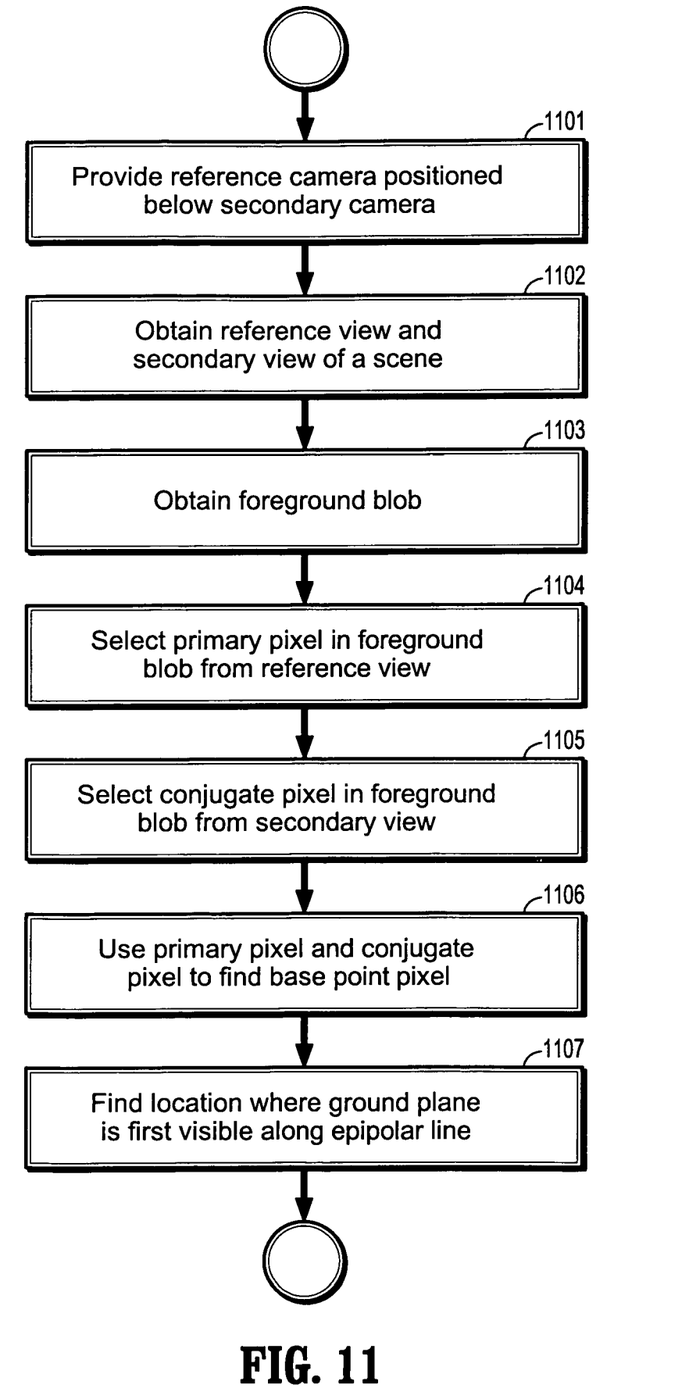
FIG. 11 depicts a flow chart of a background subtraction method according to an embodiment of the invention

A flow chart of a background subtraction method according to an embodiment of the invention is presented in FIG. 11. At step 1101, a reference camera and a secondary camera are vertically aligned with respect to a ground plane, with the reference camera being positioned below the secondary camera(s). Note that a plurality of secondary cameras can be positioned and be within the scope of an embodiment of the invention. At step 1102, the reference camera and the secondary camera provide, respectively, a reference view and a secondary view of a scene to be analyzed. The analysis includes identifying a foreground object and separating that foreground object from the background. At step 1103, a set of spatially clustered pixels, referred to as a foreground blob, and that corresponds to or represents an actual foreground object in the scene, is obtained. This foreground blob can be obtained by, for example, the background disparity verification algorithm. A primary pixel $I_t$ in the reference view that corresponds to a point in the foreground blob is selected at step 1104, and a conjugate pixel $I_{t'}$ in the secondary view corresponding to the same point is found at step 1105. The conjugate pixel can be found from a stereo search of foreground pixels along the associated epipolar line in the secondary view, as described above. The foreground pixel and its conjugate pixel are used at step 1106 to find a base pixel $I_b$ the corresponds to a base point of the foreground blob. If the foreground object is relatively far from the cameras, a weak perspective method according to an embodiment of the invention can be used to find the base point. Otherwise, a method using the vertical vanishing point and vanishing line of the ground plane can be used to find the base point, according to an embodiment of the invention. At step 1107, the base pixel $I_b$ and the primary pixel are used to find a location where the ground plane is first visible along the epipolar line. This location can be found iteratively incrementing the primary pixel, as described above, correcting for the base point pixel, until a difference $\|I_r-I_b\|$ is sufficiently small.

Methods according to embodiments of the invention were tested on a dual Pentium Xeon, 2 GHz machine. The extra processor was utilized to perform in parallel single camera background subtraction in the second camera. The resulting performance of the system was very fast, with frame rate in the range of λ25 fps.

In one exemplary, non-limiting implementation, correspondences of background pixels for the background model were determined using homographies of the principle planes present in the scene, computed on the basis of a small set of manually selected matches per plane. This typically leaves only a small set of background pixels for general stereo matching. Background subtraction was performed by computing the normalized color difference for a background conjugate pair and averaging the component differences over a n×n neighborhood (typically 3×3). To deal with different levels of variability, each background conjugate pair was modeled with a mixture of Gaussians that were updated over time. Typically, two Gaussians are sufficient. Foreground pixels were detected if the associated normalized color differences fall outside a decision surface defined by a global false alarm rate.

While a two-camera method according to an embodiment of the invention will not detect shadows as foreground, it can detect reflections of foreground objects from specular surfaces, such as wet pavement, as foreground. A simple method according to an embodiment of the invention that removes most of these specular reflections is as follows.

Figure 6A:
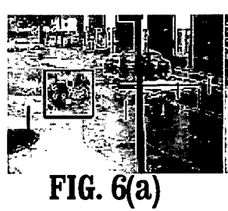
FIGS. 6(a)-(d), 7(a)-(d), 8(a)-(d), and 9(a)-(f) depict various stages in the removal of specular reflections in a variety of exemplary scenes, according to an embodiment of the invention.
Figure 7A:
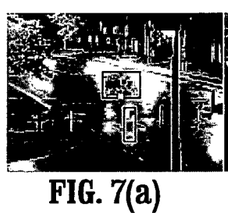
Figure 8A:
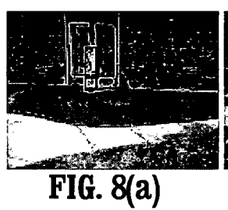
Figure 9A:
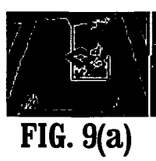

For removing specular reflections, after applying the basic two-camera method according to an embodiment of the invention to detect foreground pixels, a spatial clustering algorithm, such as a morphology and connected component analysis as are known in the art, is employed to determine the foreground objects. This is illustrated in FIGS. 6(a), 7(a), 8(a) and 9(a), where the bounding boxes surrounding the foreground pixel clusters detected by this step are shown. FIG. 6(a) illustrates a two-camera initial detection, in which a dark square marks a sampled pixel while a white square marks its base, computed using weak perspective model. FIG. 7(a) illustrates a two-camera initial detection, in which the specular region was clustered as a separate bounding box. FIG. 8(a) depicts detected pixels remaining near the top portion in the two-camera initial detection. FIG. 9(a) depicts a two-camera initial detection of an indoor scene, in which three sampled pixels are shown in dark squares, while the bounding box is the bases. Noise near the shadow was eliminated in the final detection since it was below the base. For comparison purposes, FIGS. 6(d), 7(d), 8(d), and 9(f) illustrate a single camera detection in the reference view.

Figure 6B:
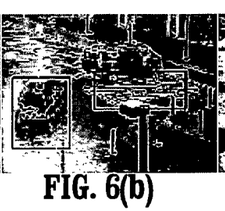
Figure 7B:
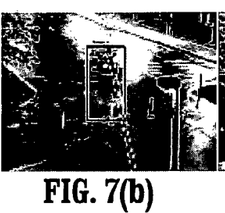
Figure 8B:
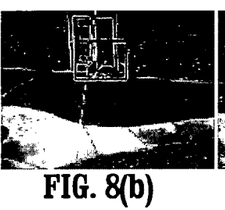
Figure 9B:
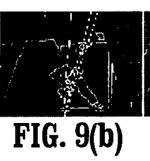

A base-point-finding algorithm according to an embodiment of the invention then finds the intersection of the foreground object with the ground plane as follows. The "topmost" pixels of the foreground region along each epipolar line passing through the bounding box are identified, and for each of these topmost pixels the image gradient is evaluated to determine whether they are good candidates for stereo matching. This will typically choose those pixels on the boundary of the object detected. Then, conjugates for these topmost points are identified. Matches are constrained to only those pixels in the second view along the epipolar line that are additionally foreground pixels detected by a single camera background subtraction algorithm, which will detect a superset of the pixels detected by the two-camera algorithm. The results of the single camera background subtraction applied to the second view are shown in FIGS. 6(b), 7(b), 8(b) and 9(b). FIG. 6(b) illustrates a single camera detection used to constrain stereo searches. A dark square marks the conjugate pixel and a white line is the associated epipolar line. In FIG. 7(b), no valid match could be found for the specular region. FIG. 8(b) illustrates a single camera detection in the second view. The conjugate pixel was found at the top of the person. FIG. 9(b) illustrates a single camera detection in the second view of the indoor scene. Stereo matches are found for the three sampled pixels. For each of the pixels chosen as conjugates, the base is found using a weak perspective model, according to an embodiment of the invention.

Figure 6C:
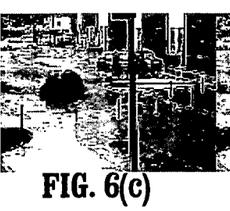
Figure 6D:
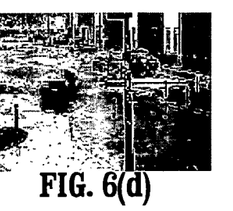
Figure 7C:
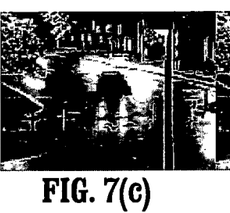
Figure 7D:
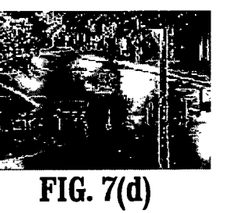
Figure 8C:
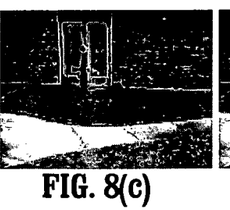
Figure 8D:
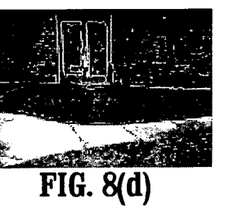
Figure 9C:
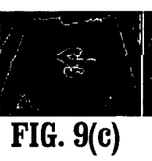

The line passing through the bases can then be constructed using a line fitting algorithm. The object is detected by "filling in" the foreground region above the base line along the epipolar lines. This is illustrated in FIGS. 6(c), 7(c), 8(c) and 9(c). FIG. 6(c) illustrates a two-camera final detection. The specular region is removed since it lies below the base point in FIG. 6(a). In FIG. 7(c), the specular region has been successfully removed in the two-camera final detection. FIG. 8(c) depicts how a foreground filling enhances the detection of a person even though he is very near the background wall. FIG. 9(c) illustrates a two-camera final detection using only one of the sampled pixels. Note that the lower boundary is not well-defined. A perspective model was used here.

According to another embodiment of the invention, one can eliminate from the initial detection any pixel detected as a foreground pixel but lying below the base of the object. This tends to eliminate specular reflections "connected" to the foreground region by the spatial clustering step. The reason is that the virtual image of an object reflected from the ground plane lies below the plane. However, it is possible that a component of reflected pixels in the reference image is not connected by the spatial clustering algorithm to the object that cast the reflection. In this case, the stereo reconstruction algorithm typically fails to find good matches along the epipolar line in the second view. This is not surprising since the observed input results from a combination of Lambertian and specular components at the point of reflection. The likelihood of getting a match is low because a difference in either the Lambertian components or the reflection properties would cause the reflected points to appear differently. Even if they are matched, the base point would lie above the reflected point. Thus, these specular components are typically eliminated, as shown in FIGS. 6(c) and 7(c). Note that the bounding box below the vehicle in FIG. 7(b) is a specular reflection from the vehicle, and is eliminated due to failure to find conjugates in the second view.

One issue associated with disparity-based background subtraction occurs when the foreground object is physically close to a surface such as a wall of a building. One proposed solution combines disparity and color information. However, since disparity information for the whole image is required, performance can become a concern. Furthermore, although the method utilizes adaptive thresholding, it is not fully invariant to shadows and illumination changes. On the other hand, because an algorithm according to an embodiment of the invention requires only initial partial detection, its performance in detecting near-background objects compares favorably. In particular, when a foreground object comes close to a background surface such as a wall, an algorithm according to an embodiment of the invention can typically still detect the top portion of the object. This initial detection can subsequently be used to initialize the base-finding algorithm. This is demonstrated in FIGS. 8(a)-(d). Besides some specularities (reflection in the long glass windows) and shadows (on the wall), the person was also walking near the background wall. In spite of that, the person was fully detected without any false alarms.

Figure 9D:
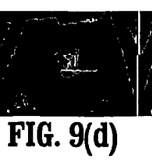
Figure 9E:
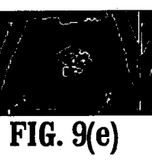
Figure 9F:
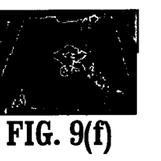

The perspective model is useful for indoor scenes, where objects are closer to the camera. An example is shown in FIGS. 9(a)-(f), where in FIG. 9(e), the bases of three chosen pixels are used to form the lower boundary of the object. Comparison with the weak perspective model is also shown in FIG. 9(d), where the object is over filled. With accurate calibration, the perspective model also performs as well as the weak perspective model for outdoor scenes. For example, the perspective model was used to compute the base point in FIGS. 8(a)-(d).

It is to be understood that the present invention can be implemented in various forms of hardware, software, firmware, special purpose processes, or a combination thereof. In one embodiment, the present invention can be implemented in software as an application program tangible embodied on a computer readable program storage device. The application program can be uploaded to, and executed by, a machine comprising any suitable architecture.

Figure 10:
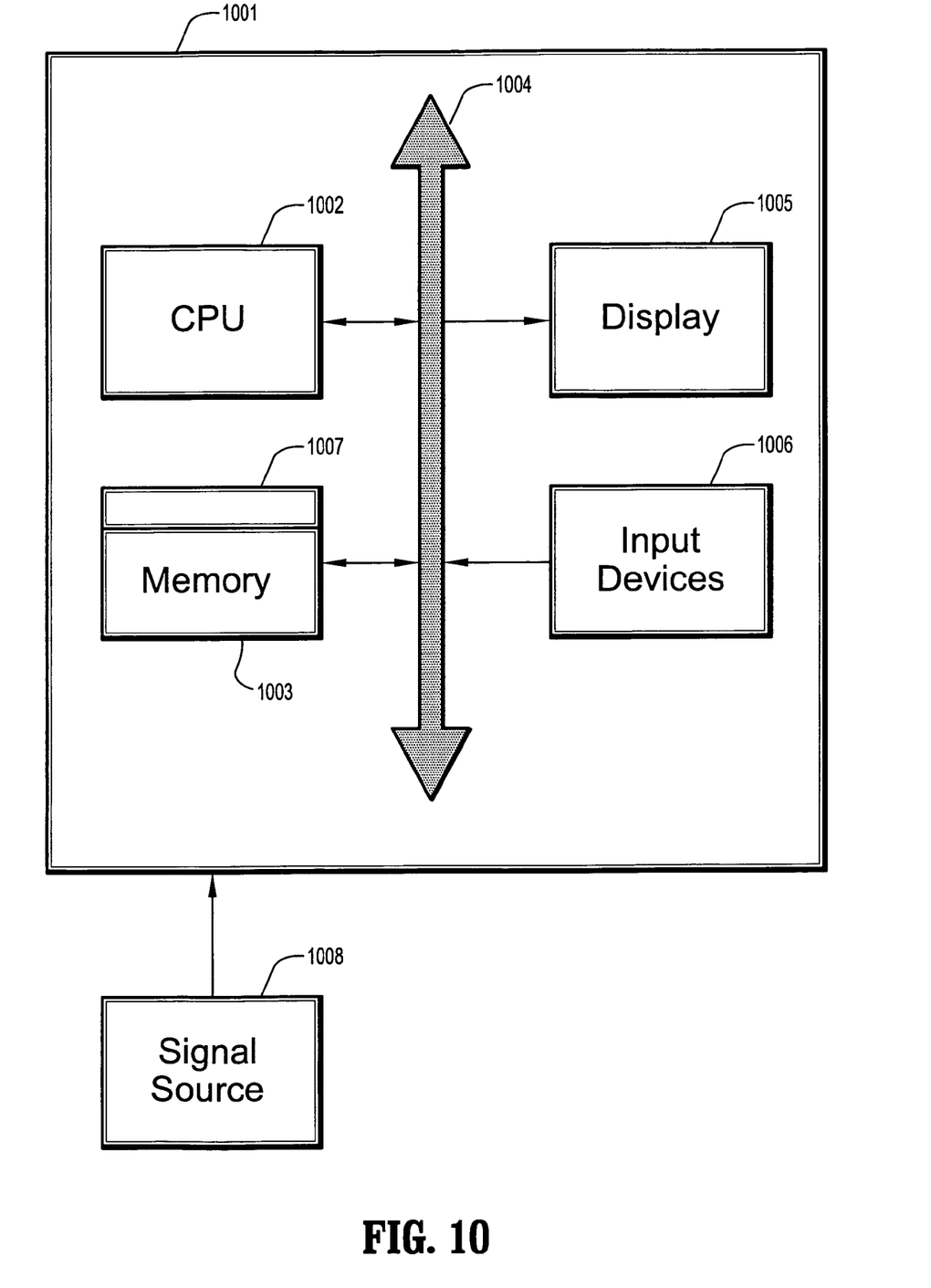
FIG. 10 is a block diagram of an exemplary computer system for eliminating errors in background detection according to an embodiment of the invention.

FIG. 10 is a block diagram of an exemplary computer system for eliminating errors in background detection according to an embodiment of the invention. Referring now to FIG. 10, a computer system 1001 for implementing the present invention can comprise, inter alia, a central processing unit (CPU) 1002, a memory 1003 and an input/output (I/O) interface 1004. The computer system 1001 is generally coupled through the I/O interface 1004 to a display 1005 and various input devices 1006 such as a mouse and a keyboard. The support circuits can include circuits such as cache, power supplies, clock circuits, and a communication bus. The memory 1003 can include random access memory (RAM), read only memory (ROM), disk drive, tape drive, etc., or a combinations thereof. The present invention can be implemented as a routine 1007 that is stored in memory 1003 and executed by the CPU 1002 to process the signal from the signal source 1008. As such, the computer system 1001 is a general purpose computer system that becomes a specific purpose computer system when executing the routine 1007 of the present invention.

The computer system 1001 also includes an operating system and micro instruction code. The various processes and functions described herein can either be part of the micro instruction code or part of the application program (or combination thereof) which is executed via the operating system. In addition, various other peripheral devices can be connected to the computer platform such as an additional data storage device and a printing device.

It is to be further understood that, because some of the constituent system components and method steps depicted in the accompanying figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

While the present invention has been described in detail with reference to a preferred embodiment, those skilled in the art will appreciate that various modifications and substitutions can be made thereto without departing from the spirit and scope of the invention as set forth in the appended claims.

What is claimed is:

1. A method for eliminating errors in foreground object detection in digitized images comprising the steps of:
   providing a reference camera and a secondary camera, wherein said reference camera provides a reference view and said secondary camera provides a secondary view;
   vertically aligning each said camera with a baseline that is approximately perpendicular to a ground plane, wherein said reference camera is placed lower than said secondary camera;
   selecting a foreground pixel $I_t$ in said reference view of a first point in a foreground object;
   finding a conjugate pixel $I_{t'}$ of said foreground pixel in said secondary view;
   using said foreground pixel and said conjugate pixel to determine an image base pixel $I_b$ of a base point in said reference view, wherein said base point is a point on said ground plane below said first point; and
   using said foreground pixel and said image base pixel to find a location where said ground plane is first visible.

2. The method of claim 1, wherein finding said conjugate pixel comprises a stereo search of pixels of said foreground object in said secondary view, wherein said pixels lie along an associated epipolar line.

3. The method of claim 1, wherein finding a location where said ground plane is first visible comprises incrementing said foreground pixel $I_t$ by a small increment $\Delta I_t$ along said associated epipolar line, and using said incremented foreground pixel and said conjugate pixel to determine an incremented image base pixel $I_b$, until a difference $\|I_t - I_b\|$ is less than a predetermined magnitude.

4. The method of claim 3, wherein $\Delta I_t$ is at least one pixel difference in magnitude, and is less than or equal to the difference $\|I_t - I_b\|$ pixels.

5. The method of claim 1, wherein determining an image base pixel $I_b$ from said foreground pixel and said conjugate pixel comprises defining a second point m wherein the image $I_m$ of said second point in the reference view has coordinate $\Pi^{-1} * I_{t'}$, wherein $\Pi$ is a ground plane homography from the reference view to the second view; defining a detection ratio $\alpha$ by $$\alpha = \frac{Y_t - Y_m}{Y_t - Y_b},$$

wherein $Y_t$ is the y-coordinate of said first point t, $Y_m$ is the y-coordinate of said second point m, and $Y_b$ is the y-coordinate of said base point b; and defining said image base pixel $I_b$ by $$I_b = I_t + \frac{\|I_t - I_m\|}{\alpha}.$$

6. The method of claim 1, wherein determining an image base pixel $I_b$ from said foreground pixel $I_t$ and said conjugate pixel $I_{t'}$ comprises solving $$\frac{\|I_b \times I_t\|}{\beta_{ref}(\hat{l}_{ref} \cdot I_b)\|v_{ref} \times I_t\|} = \frac{\|(\prod *I_b) \times I_{t'}\|}{\beta_{sec}(\hat{l}_{sec} \cdot (\prod *I_b)\|v_{sec} \times I_{t'}\|)},$$

wherein $\Pi$ is the ground plane homography from said reference view to said secondary view, $\beta_{ref}$ and $\beta_{sec}$ are scale factors, $1_{ref}$ and $1_{sec}$ are, respectively, normalized vanishing lines of the ground plane in the reference view and the secondary view, $v_{ref}$ and $v_{sec}$ are, respectively, vertical vanishing points of the ground plane in the reference view and the secondary view, and wherein $I_b$ is constrained to lie on the line through $I_t$ and the vertical vanishing point.

7. The method of claim 1, wherein a foreground object is identified by determining a disparity map that warps said reference view into said secondary view; finding, for each primary pixel in said reference view, a corresponding pixel in said secondary view by application of said disparity map; and labeling said primary pixel as either a foreground object or an occlusion shadow of an object if said primary pixel and said corresponding secondary pixel have differing intensities.

8. The method of claim 7, wherein if said primary pixel and its corresponding secondary pixel have a same intensity, labeling said primary pixel as a background pixel.

9. The method of claim 1, further comprising removing specular reflections by obtaining a set of spatially clustered foreground pixels, determining a base point for said foreground pixel cluster, constructing a base line through said base point, and filling in the foreground pixel cluster above said base line along an epipolar line through said cluster.

10. The method of claim 9, further comprising eliminating from said foreground pixel cluster any pixel detected as a foreground pixel that lies below the baseline of said object.

11. A method for eliminating errors in foreground object detection in digitized images comprising the steps of:

providing a reference view and a secondary view of a scene;

selecting a foreground pixel $I_t$ in said reference view of a first point in a foreground object in said scene;

finding a conjugate pixel $I_t'$ of said foreground pixel in said secondary view;

using said foreground pixel and said conjugate pixel to determine an image base pixel $I_b$ of a base point in said reference view, wherein said base point is a point on a ground plane below said first point;

using said foreground pixel and said image base pixel to find a location where said ground plane is first visible; and constructing a base line through said base point, and filling in the foreground pixel cluster above said base line along an epipolar line through said cluster; and eliminating from said foreground pixel cluster any pixel detected as a foreground pixel that lies below the baseline of said object.

12. The method of claim 11, wherein said reference view is provided by a reference camera, and said secondary view is provided by a secondary camera, wherein reference camera and said secondary camera are vertically aligning with a baseline that is approximately perpendicular to a ground plane, wherein said reference camera is placed lower than said secondary camera.

13. A program storage device readable by a computer, tangibly embodying a program of instructions executable by the computer to perform the method steps for eliminating errors in foreground object detection in digitized images, said method comprising the steps of:

providing a reference camera and a secondary camera, wherein said reference camera provides a reference view and said secondary camera provides a secondary view;

vertically aligning each said camera with a baseline that is approximately perpendicular to a ground plane, wherein said reference camera is placed lower than said secondary camera;

selecting a foreground pixel $I_t$ in said reference view of a first point in a foreground object;

finding a conjugate pixel $I_t'$ of said foreground pixel in said secondary view;

using said foreground pixel and said conjugate pixel to determine an image base pixel $I_b$ of a base point in said reference view, wherein said base point is a point on said ground plane below said first point; and using said foreground pixel and said image base pixel to find a location where said ground plane is first visible.

14. The computer readable program storage device of claim 13, wherein finding said conjugate pixel comprises a stereo search of pixels of said foreground object in said secondary view, wherein said pixels lie along an associated epipolar line.

15. The computer readable program storage device of claim 13, wherein finding a location where said ground plane is first visible comprises incrementing said foreground pixel $I_t$ by a small increment $\Delta I_t$ along said associated epipolar line, and using said incremented foreground pixel and said conjugate pixel to determine an incremented image base pixel $I_b$, until a difference $\|I_t - I_b\|$ is less than a predetermined magnitude.

16. The computer readable program storage device of claim 15, wherein $\Delta I_t$ is at least one pixel difference in magnitude, and is less than or equal to the difference $\|I_t - I_b\|$ pixels.

17. The computer readable program storage device of claim 13, wherein determining an image base pixel $I_b$ from said foreground pixel and said conjugate pixel comprises defining a second point m wherein the image $I_m$ of said second point in the reference view has coordinate $\Pi^{-1}*I_t'$, wherein $\Pi$ is a ground plane homography from the reference view to the second view; defining a detection ratio $\alpha$ by $$\alpha = \frac{Y_t - Y_m}{Y_t - Y_b},$$

wherein $Y_t$ is the y-coordinate of said first point t, $Y_m$ is the y-coordinate of said second point m, and $Y_b$ is the y-coordinate of said base point b; and defining said image base pixel $I_b$ by $$I_b = I_t + \frac{\|I_t - I_m\|}{\alpha}.$$

18. The computer readable program storage device of claim 13, wherein determining an image base pixel $I_b$ from said foreground pixel $I_t$ and said conjugate pixel $I_t'$ comprises solving $$\frac{\|l_b \times I_t\|}{\beta_{ref}(\hat{l}_{ref} \cdot I_b) \|v_{ref} \times I_t\|} = \frac{\|(\prod * I_b) \times I_{t'}\|}{\beta_{sec}(\hat{l}_{sec} \cdot (\prod * I_b) \|v_{sec} \times I_{t'}\|)},$$

wherein $\Pi$ is the ground plane homography from said reference view to said secondary view, $\beta_{ref}$ and $\beta_{sec}$ are scale factors, $1_{ref}$ and $1_{sec}$ are, respectively, normalized vanishing lines of the ground plane in the reference view and the secondary view, $v_{ref}$ and $v_{sec}$ are, respectively, vertical vanishing points of the ground plane in the reference view and the secondary view, and wherein $I_b$ is constrained to lie on the line through $I_t$ and the vertical vanishing point.

19. The computer readable program storage device of claim 13, wherein a foreground object is identified by determining a disparity map that warps said reference view into said secondary view; finding, for each primary pixel in said reference view, a corresponding pixel in said secondary view by application of said disparity map; and labeling said primary pixel as either a foreground object or an occlusion shadow of an object if said primary pixel and said corresponding secondary pixel have differing intensities.

20. The computer readable program storage device of claim 19, wherein if said primary pixel and its corresponding secondary pixel have a same intensity, labeling said primary pixel as a background pixel.

21. The computer readable program storage device of claim 13, said method further comprising removing specular reflections by obtaining a set of spatially clustered foreground pixels, determining a base point for said foreground pixel cluster, constructing a base line through said base point, and filling in the foreground pixel cluster above said base line along an epipolar line through said cluster.

22. The computer readable program storage device of claim 21, said method further comprising eliminating from said foreground pixel cluster any pixel detected as a foreground pixel that lies below the baseline of said object.

\* \* \* \* \*